May 12, 1959
V. C. HALL
2,886,157
TABLET FEED DEVICE AND PROCESS
Filed Feb. 28, 1956
2 Sheets-Sheet 1
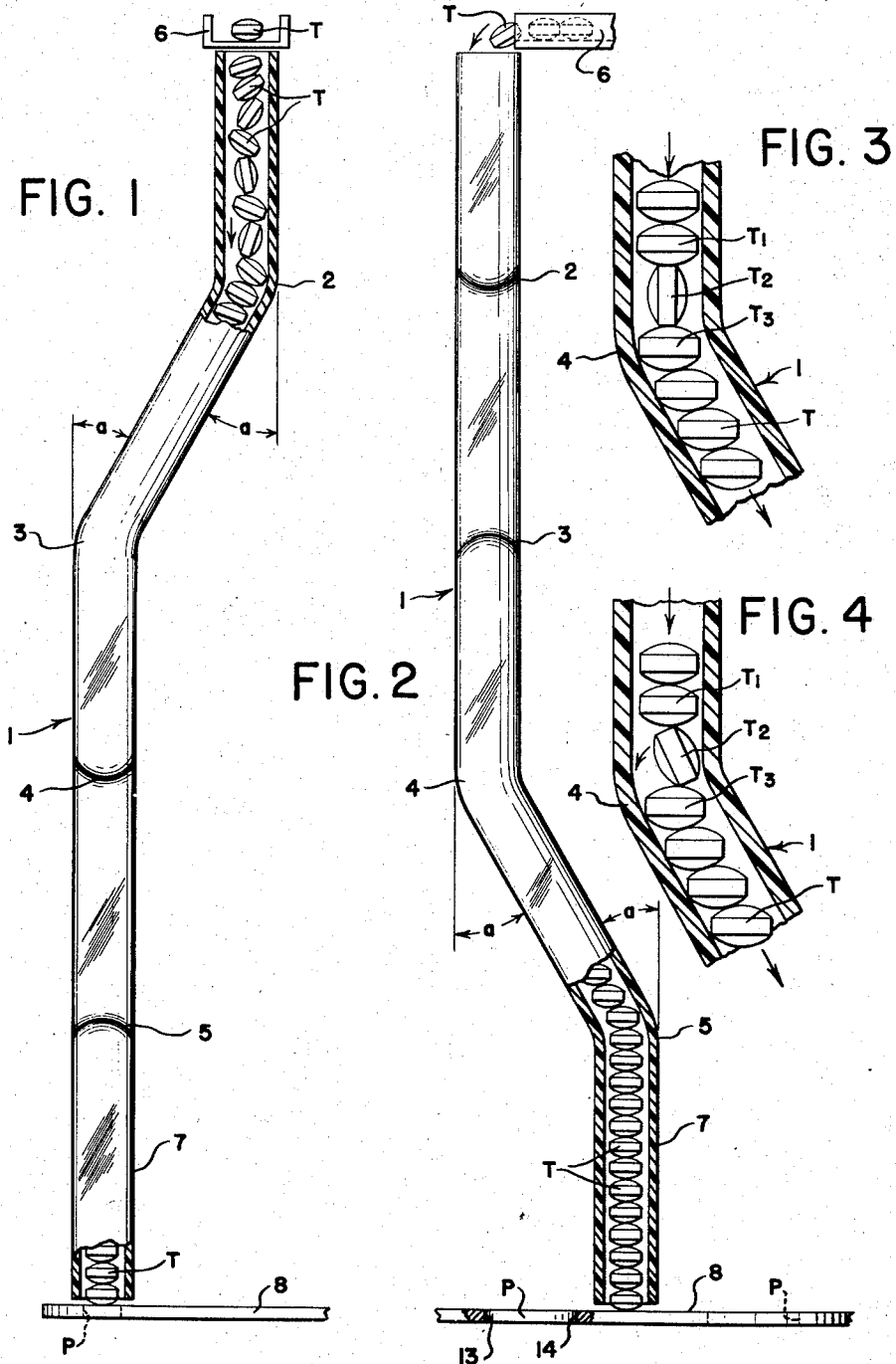
INVENTOR
Victor C. Hall
BY
ATTORNEYS May 12, 1959  V. C. HALL  2,886,157
TABLET FEED DEVICE AND PROCESS
Filed Feb. 28, 1956  2 Sheets-Sheet 2

INVENTOR
Victor C. Hall
BY
ATTORNEYS

United States Patent Office 2,886,157
Patented May 12, 1959

2,886,157

TABLET FEED DEVICE AND PROCESS

Victor C. Hall, Media, Pa., assignor to Merck & Co., Inc., Rahway, N.J., a corporation of New Jersey Application February 28, 1956, Serial No. 568,215

6 Claims. (Cl. 193—43)

This invention relates to devices for feeding more or less disc-like or relatively thin objects by gravity from a supply of the objects to a receiving device, and has for its object the provision of a pipe or tube of circular, or substantially circular, cross-section disposed in an upright position into which the objects are fed at the top and removed at the bottom. When the feed is at a greater rate than the removal, the objects accumulate one over the other in the pipe, all in an orderly flat position at the bottom so that they can be removed conveniently without interrupting the operation of the receiving device.

In feeding flat, disc-like objects of circular or substantially circular exterior shape such as medicinal tablets, coins, disc-like objects, and the like (hereinafter, for convenience, called tablets) from a supply source through the upright pipe, the object is to cause them to pass out of the pipe in a flat position, so that they can be received at the outlet of the pipe in an orderly position for further processing, packaging, or related operations. It very frequently happens that in passing tablets through a straight pipe one or more of the tablets will enter at a tilted angle and fall through the pipe in an edgewise position and when it reaches the bottom in this position it interferes with the operation of the receiving device which is designed to receive objects only in the flat position.

It is an object of this invention to provide an improved pipe for the transfer of such tablets that automatically orients them to the flat position with the elimination of the aforementioned difficulties.

The invention also provides a process for the orderly transfer of tablets from a supply source to a receiving means which comprises, providing a pipe having a plurality of bends in different planes which is only slightly larger in diameter than the maximum circular diameter of the tablets, maintaining the pipe filled with tablets, continuously introducing tablets into the top of the pipe in indiscriminate order some of which are tilted from a horizontal position, passing the tablets downwardly through the bends of the pipe and orienting the tilted tablets to a horizontal position, passing the tablets stacked one upon another through an upright lower portion of said pipe, and removing the tablets while in their horizontal position from the lower part of the pipe.

The improved feed pipe of the invention is bent at suitable curves at several places and in different planes and includes an upright lower or discharge section, whereby objects only slightly smaller in diameter than the pipe can be fed into the top in any position, and in falling through the differently disposed bends they are shifted to assume a flat or horizontal orderly position on reaching the lower upright section.

According to the invention, when the tablets are fed into the top of the pipe at the same or a faster rate than withdrawn at the bottom, the pipe can be kept filled more or less at the top during normal operation with the result that the tablets are all oriented to a flat horizontal position by the time they pass through all the bends to the lower part. Consequently, in the preferred operation, there is a continuous reserve of suitably arranged tablets at the outlet of the pipe for removal.

These and other features of the invention will be more fully understood by reference to the accompanying drawings, in which Fig. 1 is a side elevation of one form of feed pipe of the invention;

Fig. 2 is a side elevation taken at right angles to Fig. 1;

Figs. 3, 4 and 5 are fragmentary sectional views at one end of the bends of a pipe of the invention illustrating the orientation of a tablet;

Figure 5:
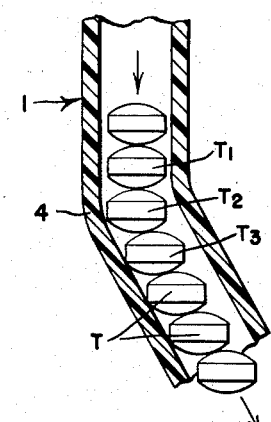

The feed pipe illustrated in Figs. 1 to 7 of the drawings may be formed of any suitable material such as metal, glass, or stiff hard plastic. It is advantageous to use a clear material such as glass or plastic through which the tablets can be seen. While it is preferred to use a pipe which is circular in cross-section, this is not absolutely necessary, since pipes which closely approximate a circular cross-section can also be used. The pipe should have an inner diameter only slightly greater than the maximum diameter of the tablet so that the tablet can assume any position without undue looseness.

The pipe 1 illustrated in the drawings is circular in cross-section and is bent twice in the same plane at 2 and 3 as best shown in Fig. 1 and at 4 and 5 as best shown in Fig. 2. The bends are smooth and free of obstructing sharp angles and the angles $a$ may vary, say, from 30° to 45° so that contiguous sections of the pipe will lie at an angle of from 135° to 150° to one another. In feeding medicinal tablets T of the type illustrated, which may, for example, be about ½ inch in diameter and proportioned as illustrated, from a source 6, the inner diameter of the pipe should be just enough larger than the tablets that the tablets will fall therethrough freely. Preferably the pipe should be just enough larger than the tablets that the tablets can pass through in any position. The pipe comprises an upright lower section 7 of appreciable length in which the tablets are stacked one over another during operation as the tablets are preferably fed into the top at a faster rate than removed at the bottom by the receiver 8.

Figs. 3, 4 and 5 illustrate the orientation of tablets in passing through one of the bends of a pipe such as that shown in Figs. 1 and 2. Fig. 3 shows tablet $T_2$ in an upright (non-flat) position between tablets $T_1$ and $T_3$. As these tablets move down through the bend in the tube, the lateral shifting of tablet $T_3$ moves the lower edge of tablet $T_2$ sideways as shown in Fig. 4. This tilting movement of tablet $T_2$ results in its movement to a flat position as shown in Fig. 5. If the tablet $T_2$ of Fig. 3 is in a different vertical plane, a similar action to that shown in Figs. 3, 4 and 5 will take place at the next lower bend, assuring that the upright tablet comes to a horizontal position.

Figure 6:
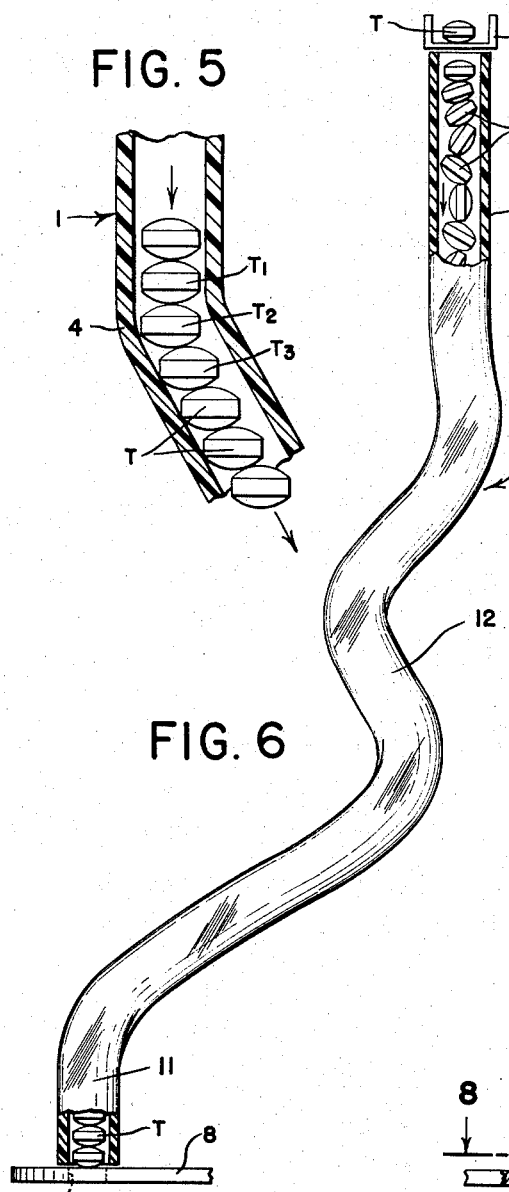
Fig. 6 is a side elevation of another form of feed pipe of the invention.
Figure 7:
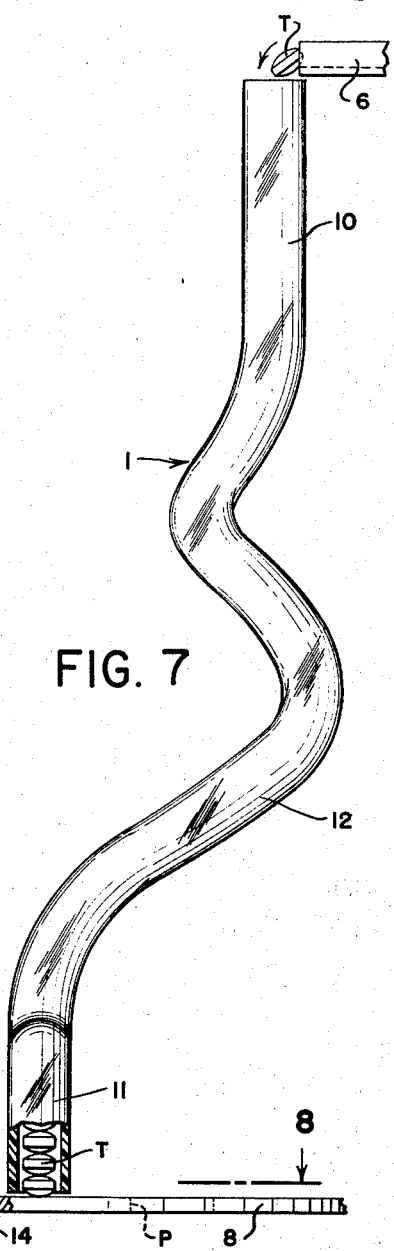
Fig. 7 is a side elevation taken at right angles to Fig. 6.
Figure 8:
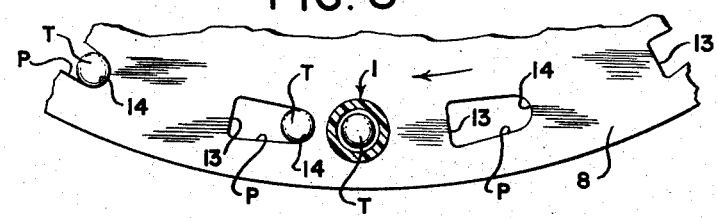
Fig. 8 illustrates one type of tablet-receiving device.

The form of bent pipe of the invention illustrated in Figs. 6 to 8 has an inside diameter only slightly larger than the maximum diameter of the tablets T and comprises an upright upper section 10, lower upright section 11 and an intermediate helical section 12. The helical section makes at least one complete turn, advantageously about one and one-half turns. The pitch of the helix can vary progressively as shown, but must be at least such that the tablets will continue to fall downwardly and not become lodged at any place in the pipe. The tablets are continuously fed into the top by the supply device 6 and are removed at the bottom one at a time by the receiving device 8.

Various types of receiving devices may be provided and operated in combination with the feed pipe. One very effective type of receiver is illustrated in the drawings. This receiver is a rotary flat plate comprising a circular arrangement of spaced-apart pockets P the width of which at the leading edges 13 are considerably wider than the tablets so that the tablets can fall into the pockets without chipping the edges. As the plate rotates preferably over a flat supporting stationary member (not shown) the tablets assume a position against the curved surfaces 14 and are carried to various other receiving, packaging, storing or grading devices.

One effective manner of operating the feed pipes of the invention is to provide such a continuous supply of tablets at 6 and to remove them at such a rate by the receiving device 8 that the pipe is completely or substantially completely filled at all times, as illustrated. When any of the tablets enter the top in a non-flat position, the first bend orients them in one plane. As they pass progressively through the pipe from one curved portion to another they become oriented to a flat horizontal position, stacked one over another in the lower upright section of the pipe.

This application is a continuation-in-part of my copending application Serial No. 466,376, filed November 2, 1954, now abandoned.

I claim:

1. A device for feeding small disc-like objects such as tablets by gravity from a supply above to a receiver below comprising a pipe which is larger in diameter than the tablet, said pipe being secured in a generally upright position for operation and through which the tablets can fall freely, said pipe being characterized by having an upright section of pipe at the top where the tablets enter, an upright section of pipe where the tablets leave at the receiver, a helical section of pipe between the upper and lower sections having a plurality of bends the pitch of which are at least sufficient to permit the tablets to pass freely therethrough, a tablet supply means at the top, and a receiver below for receiving the tablets at a slower rate than the tablets are fed at the top, whereby the tube is kept filled with tablets during operation, the inner diameter of the tube being only slightly greater than the maximum diameter of the tablet.

2. The process of transferring disc-like tablets from a supply of tablets above to a receiving means below which comprises, providing a pipe having a plurality of bends in different planes which is only slightly larger in diameter than the circular diameter of the tablets, maintaining the pipe filled with tablets, continuously introducing tablets into the top of the pipe in indiscriminate order some of which are tilted from a horizontal position, passing the tablets downwardly through the bends of the pipe and orienting the tilted tablets to a horizontal position, passing the tablets stacked one upon another through an upright lower portion of said pipe, and removing the tablets while in their horizontal position from the lower part of the pipe.

3. A device for feeding small disc-like objects, such as tablets, by gravity from a source of supply to a receiver located at a lower level which comprises a pipe having an inner diameter only slightly greater than the maximum dimension of the disc-like objects to be fed, said pipe being in a generally upright position to receive the disc-like objects, said pipe being characterized by having a continuously open passage therethrough from end to end through which the tablets can move by gravity and a plurality of bends for orienting non-horizontally-positioned disc-like objects to a horizontal, stacked position, the respective bends connecting sections of the pipe lying at substantial angles to one another, with certain sections of said pipe lying in a plane substantially at right angles to a plane in which other sections lie, the upper end of the pipe being substantially vertical for a distance sufficient to receive several of the disc-like objects in stacked relation, and means at the lower end of the pipe restricting free discharge of the disc-like objects from the pipe, whereby said pipe may be maintained full of said objects, and said objects moving through the pipe in a non-horizontal position will rest upon objects beneath them and be oriented as they pass through said bends to a generally-horizontal, stacked position.

4. A device according to claim 3 in which contiguous sections of the pipe subtend an angle of from about 135° to 150°.

5. A device according to claim 3 in which there are two bends in the pipe lying in one of said planes and two bends in the pipe lying in the other of said planes.

6. A device according to claim 5 in which contiguous sections of the pipe subtend an angle of from about 135° to 150°.

References Cited in the file of this patent

UNITED STATES PATENTS

| | | |
|---|---|---|
| 293,898 | Martin | Feb. 19, 1884 |
| 1,677,546 | Clauss | July 17, 1928 |
| 2,432,163 | Kantor | Dec. 9, 1947 |
| 2,712,892 | Warren | July 12, 1955 |